June 8, 1926.
H. S. VINCENT
RAILWAY BOOSTER
Filed July 8, 1924
1,587,878
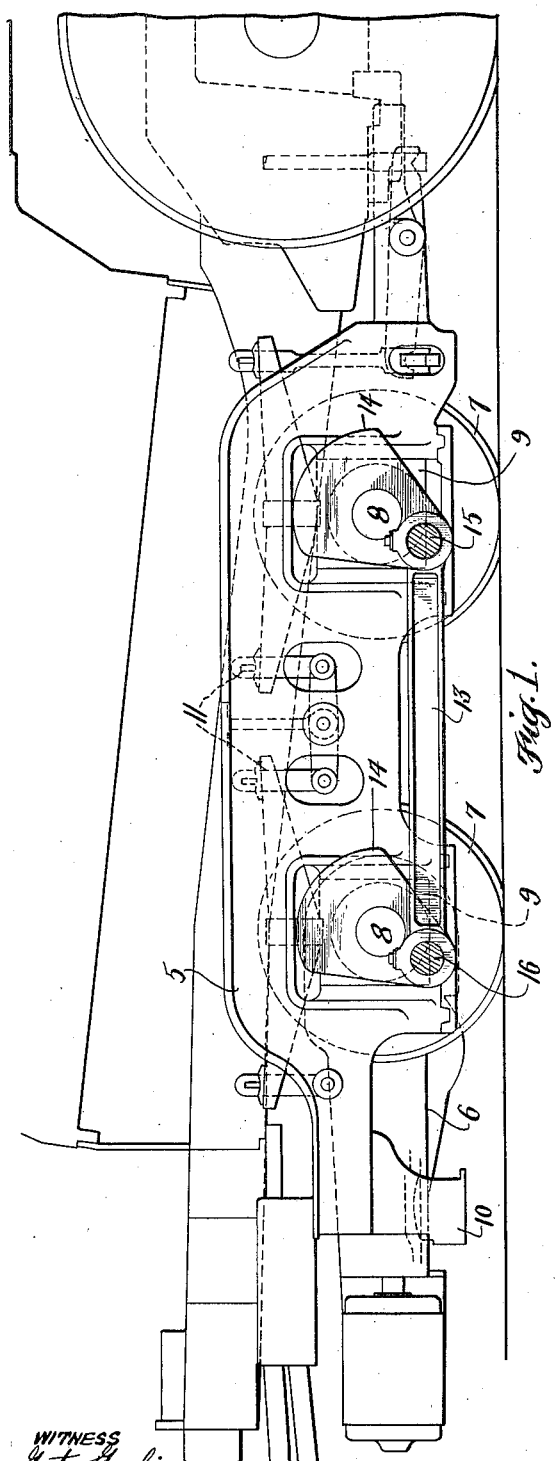
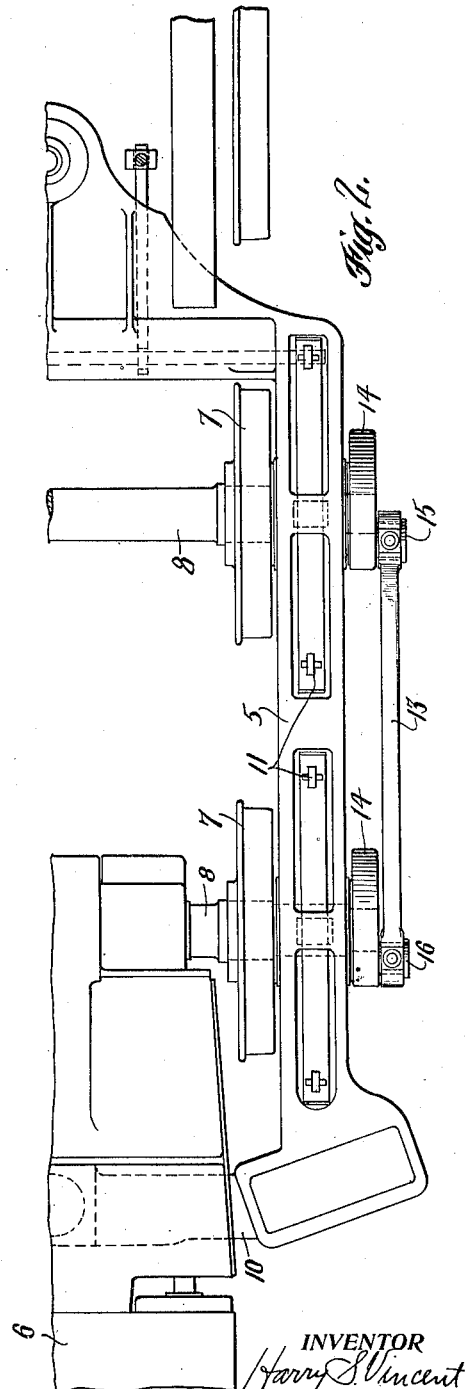
INVENTOR
Harry S. Vincent
BY
Synnestvedt & Lechner
ATTORNEYS
WITNESS
Gustav Genzlinger Patented June 8, 1926.

1,587,878

UNITED STATES PATENT OFFICE.

HARRY S. VINCENT, OF RIDGEWOOD, NEW JERSEY, ASSIGNOR TO FRANKLIN RAILWAY SUPPLY COMPANY, A CORPORATION OF DELAWARE.

RAILWAY BOOSTER.

Application filed July 8, 1924. Serial No. 724,748.

My invention relates to railway boosters, and is more especially concerned with the application of such boosters to trucks having more than one pair of wheels. I aim to improve the tractive ability and reliability of such boosters by preventing slippage of the truck wheels, or by promptly stopping slippage when it occurs. How these and other advantages can be realized through my invention in a novel manner will appear from my description hereinafter of a selected and preferred embodiment. I have here illustrated this embodiment as comprising a simple form of four wheel truck located beneath the fire box of a locomotive. However, it will be apparent that the utility of my invention is not limited to any particular number of wheels, nor to the particular type or construction of truck shown, and that it can be adapted and applied to trucks of tenders and other railway vehicles, as well as to those of locomotives.

In the drawings Fig. 1 is a simple elevation of a booster equipped truck applied to a locomotive as mentioned above, and conveniently embodying my invention; and Fig. 2 is a plan view of the truck, with various overlying parts of the locomotive that appear in Fig. 1 omitted.

The truck frame here shown is of ordinary type, except that its side frame 5 extends somewhat further to the rear than usual, for the purpose of affording more advantageous support for the booster 6. The wheels 7 (of which only those at one side of the truck are shown) are fast on the axles 8, as usual, and these axles are mounted in journal boxes 9 themselves mounted in the pedestal jaws of the side frame 5. The booster 6 is shown as mounted about and directly driving the rear axle 8, being supported partly by said axle and partly by the rear end piece 10 of the truck frame. As shown, the truck is provided with spring rigging generally and comprehensively indicated by the reference numeral 11, for transmitting the weight from the truck frame to the axle boxes 9. With the mounting of the booster 6 and the arrangement of the other parts shown, it will be seen that a preponderance of the weight is borne by the rear axle 8 and wheels 7, so that the adhesion of these wheels is greater than that of the forward wheels of the truck.

Normally, the booster 6 drives only the wheels 7 to whose axle 8 it is applied, and the other wheels revolve idly; but provision is made for transmitting power to the wheels 7 on the other axle 8 when the directly driven wheels slip. As here shown, this is done by a connection between the front and rear axles 8, 8 that is normally inoperative or ineffective, but quickly comes into play when slippage occurs, and stops such slippage. In the present instance, the connection is made by a pitman or side rod 13 and counter-balanced cranks 14 mounted on the outer ends of the axles 8, beyond the boxes 9 and the side frames 5,—wheels 7 being inside the side frames. While the connection might, of course, be made yielding in various ways, as already mentioned, in the present instance lost motion is provided for this purpose, by making one end of the rod 13 slightly loose on its crank pin 15, while the other end has an ordinary journal fit on its crank pin 16. Since, therefore, power is not ordinarily transmitted through the rod 13, the latter can be much lighter than if intended to drive under ordinary circumstances. Whenever the normally active rear wheels 7 slip, the clearance motion at the crank pins is taken up and the connection quickly brings the front wheels into play to stop the slippage. As the contact with the track is doubled when the front wheels 7 thus become active, this remedy is very effective.

I claim:

1. The combination with a railway truck having a plurality of wheels, of a booster normally driving one of the wheels, and normally inoperative means for transmitting power to another wheel when that first mentioned slips.

2. The combination with a railway truck having a plurality of axles and pairs of wheels, of a booster driving a wheel on one of said axles, and normally inoperative means for transmitting power from such wheel to one on another axle when the first-mentioned wheel slips.

3. The combination of a railway truck having a plurality of axles and pairs of wheels, with a preponderance of weight on one of the axles and a booster driving it, and normally ineffective means for transmitting power from such axle to a lighter-loaded one when slippage occurs at the heavier loaded axle.

4. The combination of a railway truck having a plurality of axles and pairs of wheels, a booster driving one of said axles, and a normally ineffective crank and rod connection between said axle and another for bringing the wheels on the latter into play to stop slippage at the first-mentioned axle.

5. The combination of a railway truck having a plurality of axles and pairs of wheels, with a preponderance of weight on one of the axles and a booster driving it, and a crank and rod connection between said axle and a lighter-loaded one affording such lost motion as to be normally unloaded, but effective for transmission of power when slippage occurs at the heavier loaded axle.

In testimony whereof, I have hereunto signed my name.

HARRY S. VINCENT.